US008277352B2

(12) United States Patent
Ivantysynova et al.

(10) Patent No.: US 8,277,352 B2
(45) Date of Patent: Oct. 2, 2012

(54) POWER SPLIT TRANSMISSION WITH ENERGY RECOVERY

(75) Inventors: Monika Marianne Ivantysynova, Lafayette, IN (US); Blake Adam Carl, Richland, MI (US); Kyle Richard Williams, Decatur, IL (US)

(73) Assignee: Purdue Research Foundation, West Lafayette, IN (US)

(*) Notice: Subject to any disclaimer, the term of this patent is extended or adjusted under 35 U.S.C. 154(b) by 932 days.

(21) Appl. No.: 11/854,178

(22) Filed: Sep. 12, 2007

(65) Prior Publication Data

US 2008/0081724 A1 Apr. 3, 2008

Related U.S. Application Data

(60) Provisional application No. 60/825,336, filed on Sep. 12, 2006, provisional application No. 60/890,536, filed on Feb. 19, 2007.

(51) Int. Cl.
F16H 47/04 (2006.01)
(52) U.S. Cl. ....................................... 475/73
(58) Field of Classification Search .............. 475/72, 475/73
See application file for complete search history.

(56) References Cited

U.S. PATENT DOCUMENTS

| | | | |
|---|---|---|---|
| 3,455,183 A | 7/1969 | Orshansky, Jr. | |
| 3,888,139 A | 6/1975 | Orshansky, Jr. | |
| 4,387,783 A | 6/1983 | Carman | |
| 4,441,573 A * | 4/1984 | Carman et al. | 180/165 |
| 4,815,334 A | 3/1989 | Lexen | |
| 5,914,575 A | 6/1999 | Sasaki | |
| 6,057,671 A | 5/2000 | Kuno | |
| 6,086,166 A | 7/2000 | Fukasawa | |
| 6,131,680 A | 10/2000 | Nii et al. | |
| 6,164,734 A | 12/2000 | Otomo et al. | |
| 6,231,134 B1 | 5/2001 | Fukusawa et al. | |
| 6,465,988 B2 | 10/2002 | Ito et al. | |

OTHER PUBLICATIONS

D E Bowns, N D Vaughan and R E Dorey; Design study of a regenerative hydrostatic split power transmission for a city bus; C143/81; University of Bath, Avon, IMechE 1981.
Pawelski Z: Die Eigenschaften Des Stufenlosen Getriebes Mit Parallelem Leistungsdurchfluss; ATZ Automobiltechnische Zeitschrift, Vieweg Publishing, Wiesbaden, DE, vol. 99, No. 3, Mar. 1997, pp. 174-176, 178, 18, XP000682348—ISSN: 0001-2785 figures 3,8.

(Continued)

Primary Examiner — David D Le
Assistant Examiner — Erin D Bishop
(74) Attorney, Agent, or Firm — Hartman Global IP Law; Gary M. Hartman; Domenica N. S. Hartman

(57) ABSTRACT

Power split drive (PSD) transmissions capable of energy recovery and suitable for use in automotive applications. Each PSD transmission includes a mechanical transmission system for mechanically transmitting mechanical power between a rotatable input shaft and a rotatable output shaft, and a hydraulic transmission system containing a fluid for hydraulically transmitting hydraulic power between the input shaft and the output shaft, and at least a third shaft operatively interconnected to one of the mechanical and hydraulic transmission systems. The hydraulic transmission system is operatively coupled by at least a first planetary gear train to the mechanical transmission system. According to the invention, the PSD further comprises means operatively associated with at least one of the mechanical and hydraulic transmission systems for storing and releasing energy within the PSD transmission, the energy storing and releasing means comprising a flywheel or an accumulator or a combination thereof.

18 Claims, 12 Drawing Sheets

OTHER PUBLICATIONS

R E Dorey and N D Vaughan; the Computer Aided Investigation and Performance Evaluation of a Regenerative Hydrostatic Split Power Transmission for a City Bus; School of Engineering, University of Bath, Bath, England, Sep. 1984.

* cited by examiner

| Power flow mode | Power flow diagram | Signals for displacement control |
|---|---|---|
| 0. Recirculatory reverse (eng propel) | 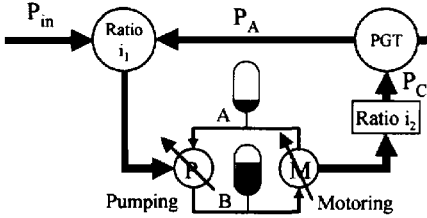 | Standard control: <u>Feedback signals</u> Unit 1: N/A Unit 2: $v_{veh}$ <u>Command signals</u> Unit 1: (Fixed @ max) Unit 2: $v_{veh,des}$ |

FIG. 14A

| Power flow mode | Power flow diagram | Signals for displacement control |
|---|---|---|
| I. Recirculatory (eng propel) | 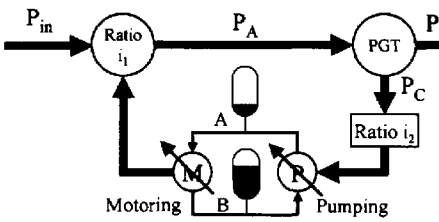 | Standard control: <u>Feedback signals</u> Unit 1: $v_{veh}$ Unit 2: N/A <u>Command signals</u> Unit 1: $v_{veh,des}$ Unit 2: (Fixed @ max) |

FIG. 14B

| Power flow mode | Power flow diagram | Signals for displacement control |
|---|---|---|
| II. Recirculatory (braking) | 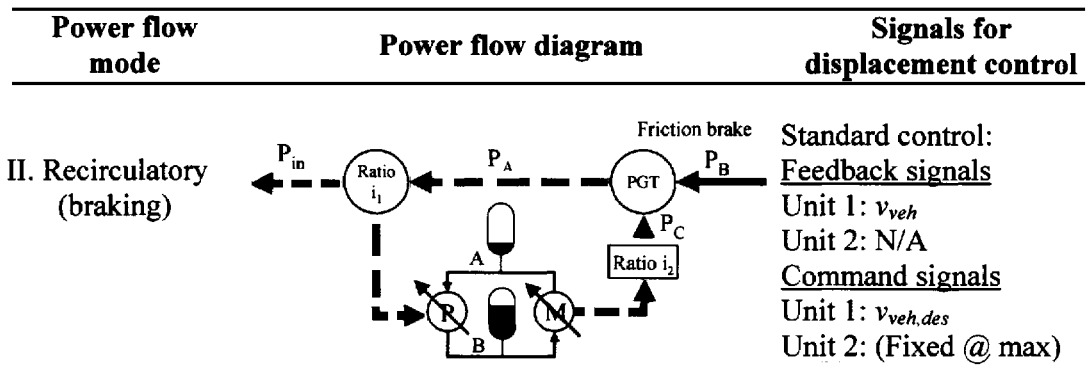 | Standard control: Feedback signals Unit 1: $v_{veh}$ Unit 2: N/A Command signals Unit 1: $v_{veh,des}$ Unit 2: (Fixed @ max) |

FIG. 14C

| Power flow mode | Power flow diagram | Signals for displacement control |
|---|---|---|
| III. Full mech (eng propel) | 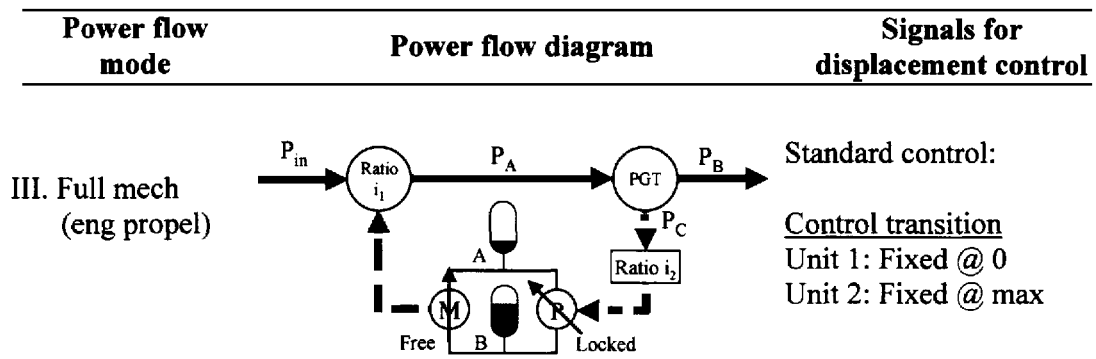 | Standard control: Control transition Unit 1: Fixed @ 0 Unit 2: Fixed @ max |

FIG. 14D

| Power flow mode | Power flow diagram | Signals for displacement control |
|---|---|---|
| IV. Additive (eng propel) | 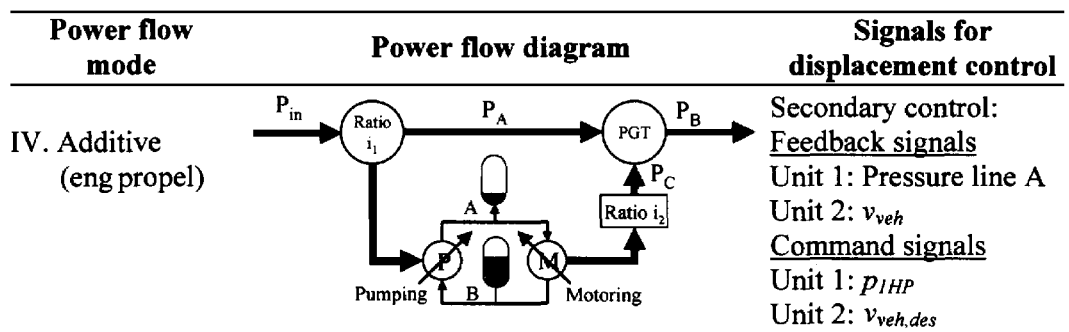 | Secondary control: <u>Feedback signals</u> Unit 1: Pressure line A Unit 2: $v_{veh}$ <u>Command signals</u> Unit 1: $p_{IHP}$ Unit 2: $v_{veh,des}$ |

FIG. 14E

| Power flow mode | Power flow diagram | Signals for displacement control |
|---|---|---|
| V. Additive (braking) | 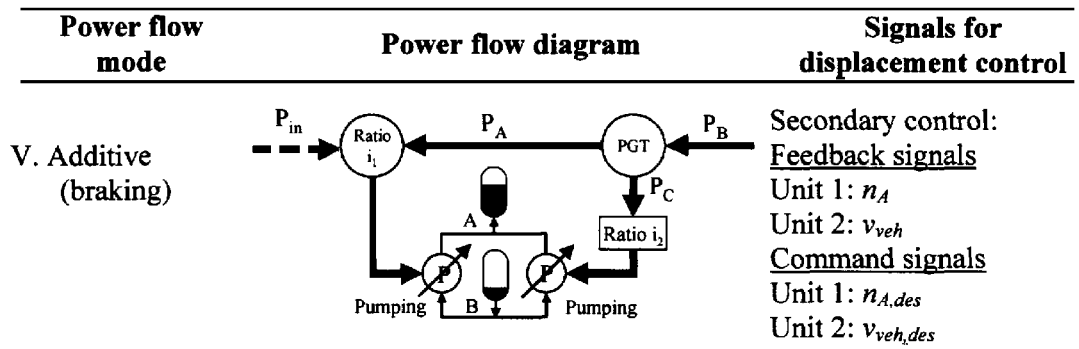 | Secondary control: <u>Feedback signals</u> Unit 1: $n_A$ Unit 2: $v_{veh}$ <u>Command signals</u> Unit 1: $n_{A,des}$ Unit 2: $v_{veh,des}$ |

FIG. 14F

| Power flow mode | Power flow diagram | Signals for displacement control |
|---|---|---|
| VI. Additive (accumulator propel) | $P_{in}$ → Ratio $i_1$ → $P_A$ → PGT → $P_B$; $P_C$; A, B Motoring, Motoring, Ratio $i_2$ | Secondary control: <u>Feedback signals</u> Unit 1: $n_A$ Unit 2: $v_{veh}$ <u>Command signals</u> Unit 1: $n_{A,des}$ Unit 2: $v_{veh,des}$ |

FIG. 14G

POWER SPLIT TRANSMISSION WITH ENERGY RECOVERY

CROSS REFERENCE TO RELATED APPLICATIONS

This application claims the benefit of U.S. Provisional Application No. 60/825,336, filed Sep. 12, 2006, and U.S. Provisional Application No. 60/890,536, filed Feb. 19, 2007, the contents of both are incorporated herein by reference.

BACKGROUND OF THE INVENTION

The present invention generally relates to power transmission systems. More particularly, this invention relates to power split transmission systems adapted for automotive applications, in which an energy recovery capability is provided by the inclusion of one or more energy storage devices.

Power transmission systems typically found in common automotive applications utilize a mechanical transmission system entirely made up of solid components including shafts, gears, and clutches, which alone may be used to transmit power to the drive wheels of a vehicle, as in the case of "manual" transmissions. Mechanical transmission systems are also used in combination with hydraulic transmission systems that use a liquid under pressure to transmit power, as in the case of an "automatic" transmission that uses a torque converter as a hydrodynamic fluid coupling.

Developments in the automotive industry, including passenger, commercial, and off-road vehicles, are shaped by a strong demand to reduce fuel consumption. In addition, there is a trend toward higher top speed capabilities in heavy off-road vehicles, where faster driving speeds on roads are desired. In response, different types of continuously variable transmissions (CVT) have been developed and brought to the market. Among the CVT concepts, hybrid drives are of particular interest to vehicle manufactures. Hybrid drives are based on the utilization of brake energy for vehicle propulsion by storing brake energy in a battery, fly wheel, hydraulic accumulator, or other energy storage means. By recapturing energy otherwise lost as heat during braking, the hybrid drive technology is capable of significantly reducing fuel consumption, particularly in heavy trucks and cars. Comprehensive overviews of hydraulic hybrid drives are provided in Stecki et al., "Advances in Automotive Hydraulic Hybrid Drives," Proceedings of the Sixth International Conference on Fluid Power Transmission and Control, Hangzhou, China (2005), and Miller, "Comparative Assessment of Hybrid Vehicle Power Split Transmissions," 4th VI Winter Workshop Series (2005). While CVT's provide seamless shifting in vehicle operation, allowing the engine to operate at a nominal speed range resulting in lower fuel consumption and emissions, typical CVT's suffer from either low shaft-to-shaft efficiency or low torque handling capabilities.

Power split transmissions (PST), also known as power split drive (PSD) transmissions, are a particular type of CVT that has found use in applications such as agricultural tractors, for example, the Fendt Vario line of tractors brought to the market by Fendt (AGCO Corporation) in 1996. See, for example, Dziuba et al., "Entwicklung eines neuen stufenlosen Schleppergetriebes mit hydrostatisch mechanischer Leistungsverzweigung," VDI-Berichte Nr. 1393, VDI-Verlag, Düsseldorf, Germany (1998), p. 541-549 (in German). Although the principle of power split drives has been known for more than four decades, this technology is still in a developmental stage.

As known, PSD transmissions traditionally use a planetary (epicyclic) gear train (PGT) in combination with a continuously variable transmission that achieves continuous variable speed control along with high efficiency levels that are derived from the mechanical gears of the PGT. There are three basic implementations of power split drives: the combination of a PGT with a continuous variable mechanical gear; the combination of a PGT with a hydrodynamic transmission; and the combination of a PGT with a hydrostatic transmission. The last of these allows further fuel savings if a drive line control concept is implemented that takes engine characteristics into account. The engine speed can be adjusted to a point where the total power loss of the transmission is minimized, as reported in Ossyra et al., "Drive Line Control for Off-Road Vehicles Helps to Save Fuel," SAE International Commercial Vehicle Engineering Congress, Chicago, Ill., USA, SAE Technical Paper 2004-01-2673 (2004). Through the improvement of the efficiency of positive displacement machines, the use of hydrostatic transmissions in PSD's has become very attractive for many different applications.

PSD transmissions have three different operating modes that are known in the automotive transmission industry under the following designations: power additive, full mechanical, and power recirculation. The power flows of these three modes are schematically represented in FIG. 1. In the power additive mode, the power, $P_{in}$, from a combustion engine (or other suitable power source) is split and transferred into two paths: a mechanical path (containing a planetary gear train), $P_{mech}$, and a hydraulic path (such as a hydrostatic transmission), $P_{hyd}$. The power is then combined and transferred as $P_{out}$ to the wheels to propel a vehicle. In full mechanical mode, power is entirely transferred from the engine to the wheels via the mechanical path ($P_{mech}$) and not through the hydraulic path ($P_{hyd}$). Generally full mechanical mode is at a single speed or has a small speed range. In the power recirculation mode, some of the power transferred via the mechanical path ($P_{mech}$) is recirculated back through the hydraulic path ($P_{hyd}$). The recirculated hydraulic power ($P_{hyd}$) is combined with the engine power ($P_{in}$) from the engine and again transferred via the mechanical path ($P_{mech}$), thus being recirculated. In general, full mechanical mode is considered to be the most efficient transmission power mode for a PSD transmission, and the power recirculation mode is considered to be the least efficient transmission power mode because large amounts of power can be recirculated through the hydraulic path.

FIG. 2 identifies PSD transmissions categorized by families based on structural similarities—first, whether the hydraulic path ($P_{hyd}$) is coupled to the input (input coupled) or to the output (output coupled) of the mechanical transmission system, and then further categorized by the characteristics of the planetary gear train (basic, multistage, or compound). A comparison of achievable efficiencies and operating characteristics of these structural approaches has been presented in Carl et al., "Comparison of Operational Characteristics in Power Split Continuously Variable Transmissions," SAE Commercial Vehicle Engineering Congress and Exhibition, Chicago, USA, SAE Technical Paper 2006-01-3468 (2006).

The basic output and input-coupled types are represented in FIGS. 3 and 8, respectively. FIG. 3 shows a basic output-coupled PSD transmission 10 as utilizing a hydrostatic transmission 12 as the hydraulic path and continuously variable part of the transmission 10. The hydrostatic transmission 12 is mechanically coupled (via a gear set) to the output of a simple planetary gear train 14 (i.e., not multistage or compound), which serves as the mechanical transmission system (path) of the transmission 10. The planetary gear train 14 is mechanically coupled (via a shaft) to a combustion engine 11 as the power source of the vehicle in which the transmission 10 is installed. The outputs of the hydrostatic transmission 12 and planetary gear train 14 are both mechanically coupled (via a gear set and a shaft, respectively) to the drive axle and wheels 19 of the vehicle. The hydrostatic transmission 12 comprises two positive displacement units 16 and 18, labeled "Unit 1" and "Unit 2" in FIG. 3. As understood in the art, the positive displacement units 16 and 18 operate by trapping and then displacing a fixed volume of hydraulic fluid. As such, the speed of the vehicle can be controlled by controlling the displacements of the units 16 and 18 using the vehicle velocity as a feedback signal. The output-coupled transmission 10 of FIG. 3 is limited to two operational modes: power additive and power recirculation. The output-coupled transmission 10 operates in the power additive mode at low speeds and the power recirculation mode at high speeds. With constant engine speed, increasing the vehicle forward velocity from standstill is achieved by increasing the displacement of the unit 16 from zero to maximum, then decreasing the displacement of the unit 18 from maximum to zero. Reverse is achieved by running the unit 16 over center. The differential pressure in the hydrostatic transmission 12 is determined by the load torque. During braking, the high pressure and low pressure lines switch as the units 16 and 18 change pumping and motoring modes.

In FIG. 8, a basic input-coupled PSD transmission 50 is shown as utilizing a hydrostatic transmission 52 as the hydraulic path and variable part of the transmission 50, and a planetary gear train 54 that serves as the mechanical path of the transmission 50. In contrast to the output-coupled PSD transmission 10 of FIG. 3, the hydrostatic transmission 52 and the planetary gear train 54 are both mechanically coupled (via a gear set and a shaft, respectively) to a combustion engine 51, the hydrostatic transmission 52 is mechanically coupled (via a gear set) to the input of the planetary gear train 54, and the output of only the planetary gear train 54 is mechanically coupled (via a shaft) to the drive axle and wheels 59 of the vehicle. Similar to the transmission 10 of FIG. 3, the speed of the vehicle is controlled by controlling the displacements of two positive displacement units 56 and 58 of the hydrostatic transmission 52, labeled "Unit I" and "Unit II" in FIG. 8, using the vehicle speed as feedback.

As with the output-coupled transmission 10 of FIG. 3, the input-coupled transmission 50 is limited to two operational modes: power additive and power recirculation. The transmission 50 operates in power recirculation mode at low speeds, and at higher speeds operates in power additive mode. This cycle can be repeated several times by adding clutches and more advanced planetary gear trains (e.g., multistage and compound). With constant engine speed, increasing the vehicle forward velocity from standstill is achieved by increasing the displacement of the unit 56 from negative maximum through zero to positive maximum, then decreasing the displacement of the unit 58. Reverse is achieved by holding the displacement of the unit 56 at maximum and decreasing the displacement of the unit 58. The differential pressure within the hydrostatic transmission system 52 is simply a reactionary item, a function of the load torque on the wheels 59. Deceleration is only possible with standard friction-type brakes connected to the wheel axle.

In view of the above, both the output-coupled and input-coupled PSD transmissions have certain limitations and inefficiencies, such that additional developments and improvements would be desirable to further expand the technical and commercial viability of PSD transmissions.

BRIEF SUMMARY OF THE INVENTION

The present invention provides power split drive (PSD) transmissions that are suitable for use in automotive applications, and exhibit improved operating efficiencies as a result of having an energy recovery capability.

A PSD transmission of this invention includes a mechanical transmission system for mechanically transmitting mechanical power between a rotatable input shaft (for example, a shaft connected to an engine) and a rotatable output shaft (for example, a shaft connected to a wheel axle), and a hydraulic transmission system containing a fluid for hydraulically transmitting hydraulic power between the input shaft and the output shaft, and at least a third shaft operatively interconnected to one of the mechanical and hydraulic transmission systems. The hydraulic transmission system is operatively coupled by at least a first planetary gear train to the mechanical transmission system. According to the invention, the PSD further comprises means operatively associated with at least one of the mechanical and hydraulic transmission systems for storing and releasing energy within the PSD transmission, the energy storing and releasing means comprising a flywheel or an accumulator or a combination thereof.

According to one aspect of the invention, the energy storing means comprises one or more flywheels and/or accumulators. In the case of the former, the flywheel may be coupled to the input shaft and/or the third shaft. In the case of the latter, at least one accumulator is preferably fluidically coupled to a positive displacement device operable to store energy from the power split transmission by operating as a pump to store a portion of the fluid at an elevated pressure in the accumulator and operable to release energy to the power split transmission by operating as a motor driven by the fluid released from the accumulator. PSD transmissions of this invention are preferably capable of combining the variability of a CVT and the efficiency of mechanical transmission systems, along with an energy storage capability that provides potential benefits for both on road and off road vehicles.

According to additional aspects of the invention, the PSD transmission can by categorized based on whether the hydraulic transmission system (defining the hydraulic path of the PSD transmission) is coupled to the input (input coupled) or to the output (output coupled) of the mechanical transmission system, and the characteristics of the planetary gear train (basic, dual-stage, or compound). Accordingly, the PSD transmission may be a basic output-coupled embodiment in which case the hydraulic transmission system is mechanically coupled through the first planetary gear train to the input shaft and mechanically coupled to the output shaft, or a compound output-coupled embodiment in which case the hydraulic transmission system is mechanically coupled through the first planetary gear train to the input shaft and mechanically coupled through a second planetary gear train to the output shaft, or a basic input-coupled embodiment in which case the hydraulic transmission system is mechanically coupled to the input shaft and mechanically coupled through the first planetary gear train to the output shaft, or a multistage input-coupled embodiment in which case the hydraulic transmission system is mechanically coupled to the input shaft and the first planetary gear train is a multistage planetary gear train that mechanically couples the hydraulic transmission system to the output shaft.

Other objects and advantages of this invention will be better appreciated from the following detailed description.

BRIEF DESCRIPTION OF THE DRAWINGS

FIGS. 14A through 14G identify eight power flow modes of input-coupled PSD transmissions of this invention.

DETAILED DESCRIPTION OF THE INVENTION

FIGS. 4 through 7 and 9 through 12 schematically represent PSD transmissions (PST's) comprising mechanical and hydrostatic transmission systems, in which the hydrostatic transmission systems (the hydraulic path of the PSD transmission) are coupled to either the output (output-coupled) or input (input-coupled) of its mechanical transmission system. In each case, the PSD transmission is capable of capturing and releasing energy, preferably over the entire speed range of the PSD transmission, through the use of a storage recovery and release system that comprises one or more accumulators integrated into the hydrostatic transmission system and/or one or more flywheels integrated into the mechanical transmission system. Because the invention takes the form of multiple embodiments that employ functionally similar components, consistent reference numbers are used where noted to identify functionally similar components.

Figure 4:
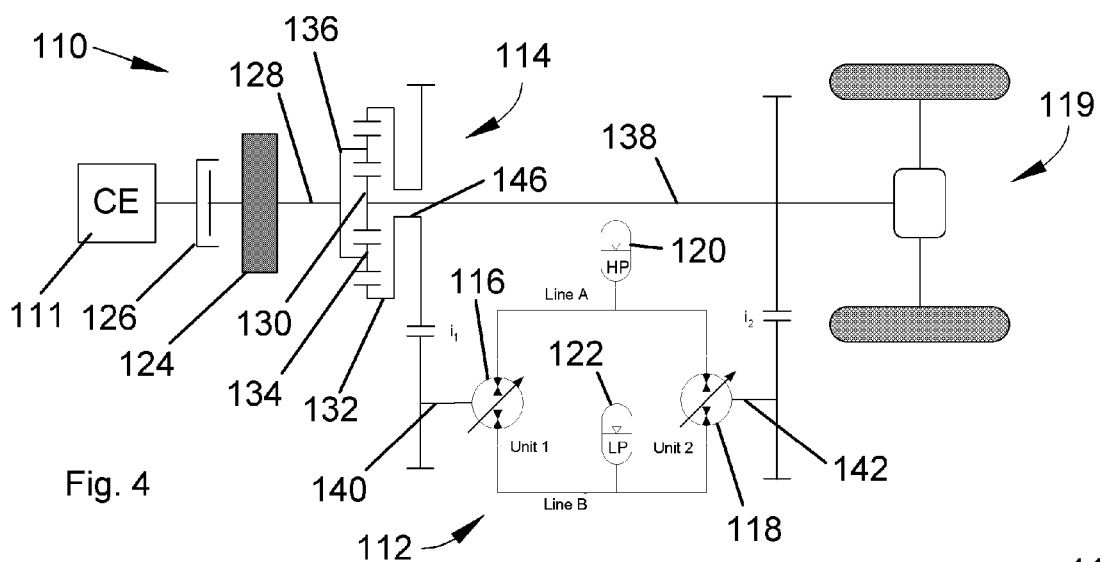
FIG. 4 schematically represents a basic output-coupled PSD transmission equipped with a flywheel and accumulator that provide an energy recovery capability in accordance with a first embodiment of this invention.

FIGS. 4 through 7 represent output-coupled PSD transmissions with energy recovery capabilities according to four embodiments of the invention. FIG. 4 represents a basic output-coupled PSD transmission 110 of this invention, with energy storage capability provided in the form of two accumulators 120 and 122 and an optional flywheel 124. The flywheel 124 is mechanically coupled to a combustion engine 111 (or other suitable power source) through a freewheel clutch 126 and is mounted on an engine-driven shaft 128 to a planetary (epicyclic) gear train 114 that forms part of the mechanical transmission system of the PSD transmission 110. As with conventional planetary gear trains, the planetary gear train 114 is represented as comprising a sun gear 130, a ring gear 132 circumscribing the sun gear 130, and planet gears 134 carried on a planet gear carrier 136 and simultaneously in mesh with the sun gear 130 and ring gear 132. In FIG. 4, the planet gear carrier 136 is shown coupled to the engine-driven shaft 128 and the sun gear 130 is mounted on an output shaft 138 of the mechanical transmission system coupled to the drive axle and wheels 119 of the vehicle.

The accumulators 120 and 122 are high pressure (HP) and low pressure (LP) accumulators, respectively, integrated into a hydrostatic transmission system 112 of the PSD transmission 110. The hydrostatic transmission system 112 further includes first and second positive displacement units 116 and 118 (Units 1 and 2), respectively, each coupled to fluid lines A and B. The first and second units 116 and 118 are coupled to the ring gear 132 and output shaft 138, respectively, with shafts 140 and 142 and suitable gearing (having gear ratios of $i_1$ and $i_2$, respectively). The high pressure and low pressure accumulators 120 and 122 are directly connected to the fluid lines A and line B, respectively. Other than pressure relief valves (not shown), additional valves could be used but are not required for the embodiment of FIG. 4 as shown.

Figure 5:
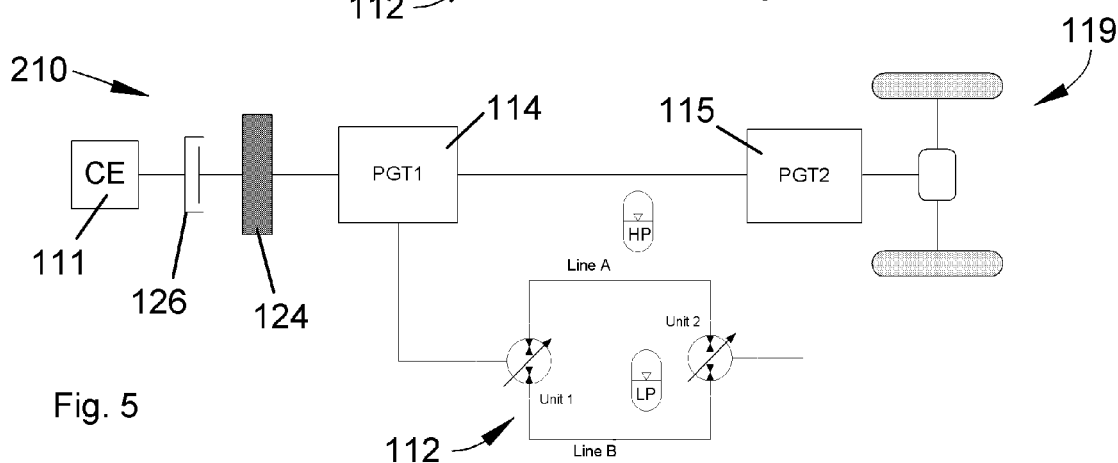
FIG. 5 schematically represents a compound output-coupled PSD transmission equipped with a flywheel and accumulator that provide an energy recovery capability in accordance with a second embodiment of this invention.
Figure 6:
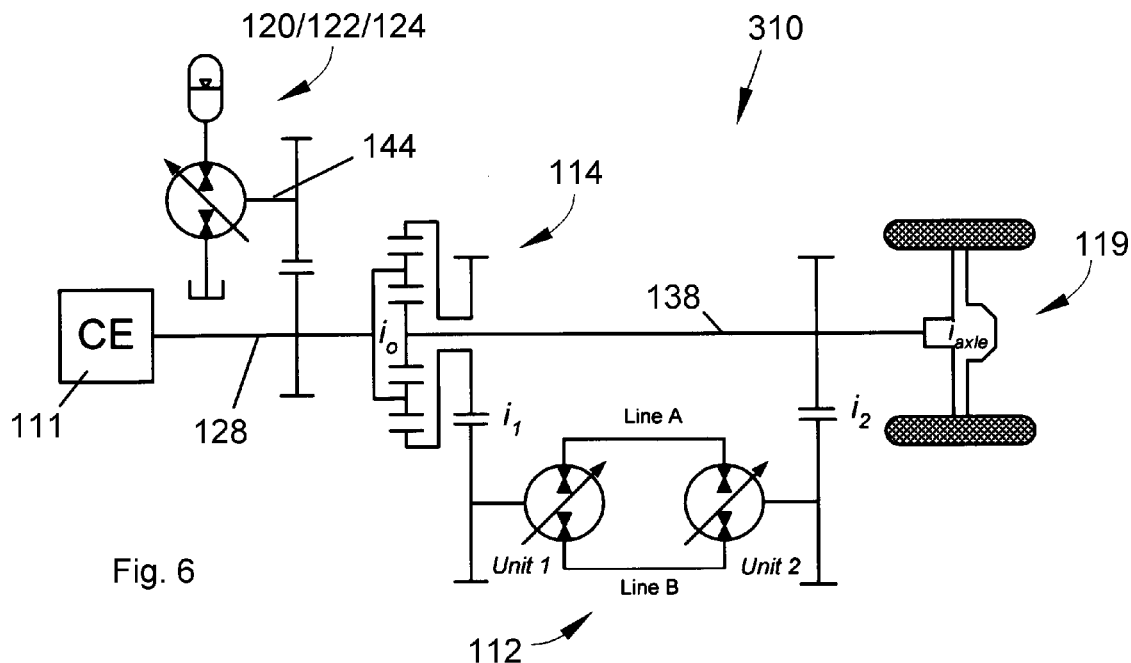
FIG. 6 schematically represents a basic output-coupled PSD transmission equipped with only an accumulator to provide an energy recovery capability in accordance with a third embodiment of this invention.
Figure 7:
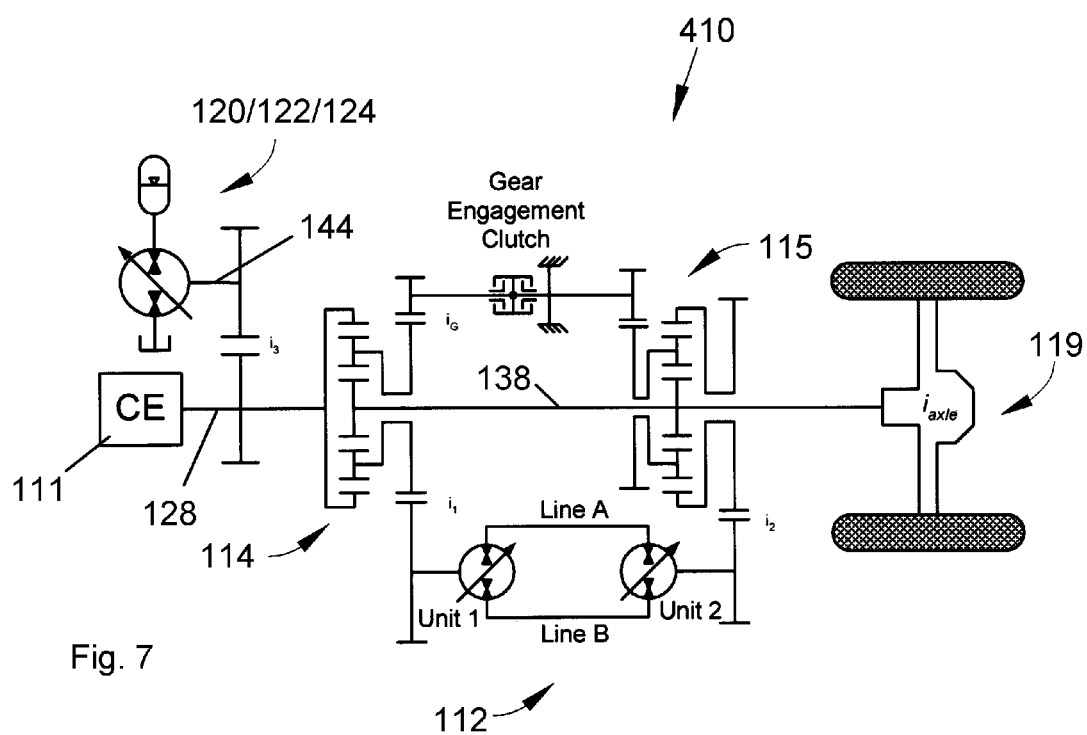
FIG. 7 schematically represents a compound output-coupled PSD transmission equipped with only an accumulator to provide an energy recovery capability in accordance with a fourth embodiment of this invention.

FIG. 5 shows a compound PSD transmission 210 that is essentially the same as the basic PSD transmission 110 of FIG. 4 (hence, the usage of the same reference numbers for its components), but with the further addition of a second planetary gear train 115 through which the hydrostatic transmission system 112 is coupled to the output shaft 138, instead of the shaft 142 and gearing of FIG. 4. FIGS. 6 and 7 further show basic and compound variations 310 and 410, respectively, of the PSD transmission 110 of FIG. 4 (hence, the usage of the same reference numbers for their components), but with energy storage means 120/122/124 coupled to the engine-driven shaft 128 by a shaft 144 and suitable gearing. While the energy storage means 120/122/124 is shown in FIGS. 6 and 7 as a single accumulator, one or more flywheels (with suitable clutches) could be used, as could combinations of accumulator(s) and flywheel(s).

With the inclusion of the flywheel 124 coupled to the engine-driven shaft 128 and/or the accumulators 120 and 122 within the hydrostatic transmission system 112, brake energy can be stored and used for vehicle propulsion. There are three main types of power flow modes associated with the output-coupled PSD transmissions of FIGS. 4 through 7: propulsion via the engine 111 or flywheel 124; propulsion via the accumulator(s) 120/122; and energy storage using the flywheel 124 and/or accumulator(s) 120/122. Energy recovery can occur in both the additive and recirculation operating modes of the PSD transmissions 110, 210, 310, and 410.

In the power additive mode, propulsion of the vehicle can be accomplished through the use of power from the engine 111 or the flywheel 124. The power from the engine/flywheel 111/124 is delivered by the shaft 128 to the planet gear carrier 136 of the planetary gear train 114. Within the gear train 114, the power is split between a shaft 146 (coupled to the ring gear 132) and the output shaft 138 (coupled to the sun gear 130). The power in the output shaft 138 is transferred to the wheels 119 through a mechanical path (e.g., the shaft 138 and wheel axle), while the power in the shaft 146 is transferred to the hydrostatic transmission system 112 (via the associated gear set). Within the hydrostatic transmission system 112, the displacement units 116 and 118 operate as a pump and motor, respectively, when the transmission 110 is in the power additive mode.

In the power additive mode, propulsion of the vehicle can also be accomplished through the use of stored energy from the accumulators 120 and 122. The stored energy is in the form of pressurized fluid within the HP accumulator 120 and is transferred to the unit 118, which acts as a motor to drive the shaft 142. The capability of driving the displacement unit 118 with pressurized fluid to propel the vehicle requires a change in the control of the displacements of the units 116 and 118 beyond that necessary for the prior art output-coupled PSD transmission 10 of FIG. 3.

Energy storage can also occur in the power additive mode using the flywheel 124 and/or accumulator(s) 120/122. When braking is desired, power is transferred to the hydrostatic transmission system 112 through the gearing connecting the shaft 142 to the output shaft 138, and transferred through the output shaft 138 to the planetary gear train 114. When storing energy with the accumulators 120 and 122, the displacement unit 118 operates as a pump and the displacement unit 116 operates at zero displacement. When storing energy with the flywheel 124, the unit 118 operates as a pump and the unit 116 operates as a motor, transferring power to the flywheel 124 via the shaft 146 and planetary gear train 114. The freewheel clutch 126 allows the flywheel 124 to accelerate and rotate at speeds faster than the engine 111, thus increasing the energy storage capability of the flywheel 124.

In the power recirculation mode, propulsion of the vehicle can be accomplished through the use of power from the engine 111 or the flywheel 124. The power from the engine/flywheel 111/124 is summed in the planetary gear train 114 through the shafts 128 and 138. The power delivered by the shaft 138 is split at gearing that couples the shaft 138 to the shaft 142 of the displacement unit 118, with part of the power being transferred to the wheels 119 to propel the vehicle and the remainder recirculated through the hydrostatic transmission system 112 to allow for further increase of vehicle speed. Within the hydrostatic transmission system 112, the displacement unit 118 operates as a motor driven by the fluid output of the displacement unit 116.

In the power recirculation mode, propulsion of the vehicle can also be accomplished through the use of stored energy from the HP accumulator 120, whose pressurized fluid is transferred to the displacement unit 118 acting as a motor.

Finally, the power recirculation mode also allows for energy storage using the flywheel 124 and/or accumulators 120/122. When braking is desired, power is transferred to the hydrostatic transmission system 112 through the gearing connecting the shafts 138 and 142, and transferred through the shaft 138 to the planetary gear train 114. When storing energy with the HP accumulator 120, the displacement unit 118 operates as a pump and the displacement unit 116 operates at either zero displacement or as a pump. When storing energy with the flywheel 124, the displacement unit 116 operates as a pump and the mode of the displacement unit 118 determines if power is recirculated to the shaft 138 or stored in the accumulator 120. Again, the freewheel clutch 126 allows the flywheel 124 to accelerate and rotate at speeds faster than the engine 111.

Figure 1:
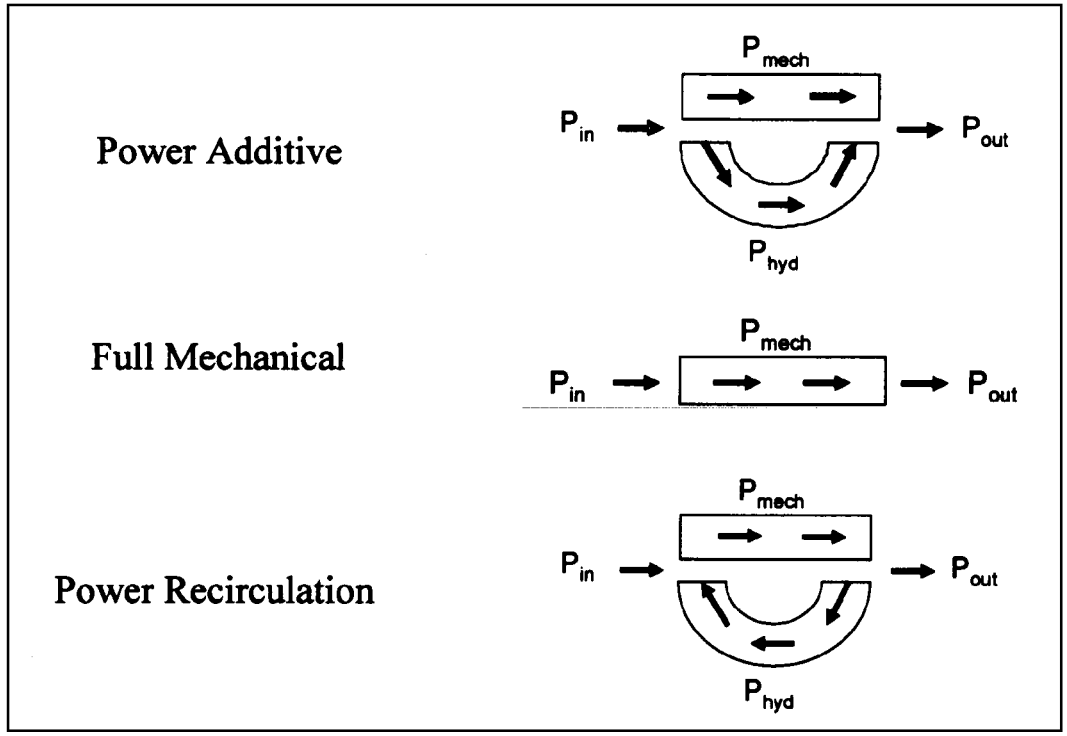
FIGS. 1 and 2 are charts showing the basic power modes and transmission families of PSD transmissions.
Figure 2:
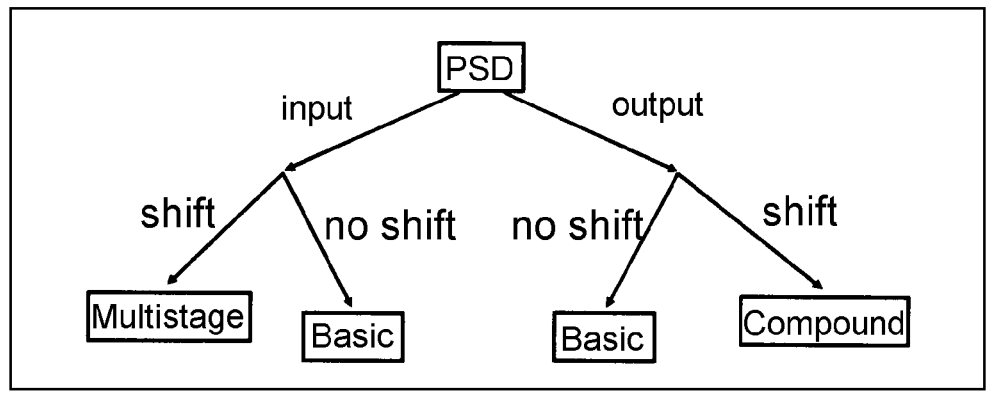
Figure 3:
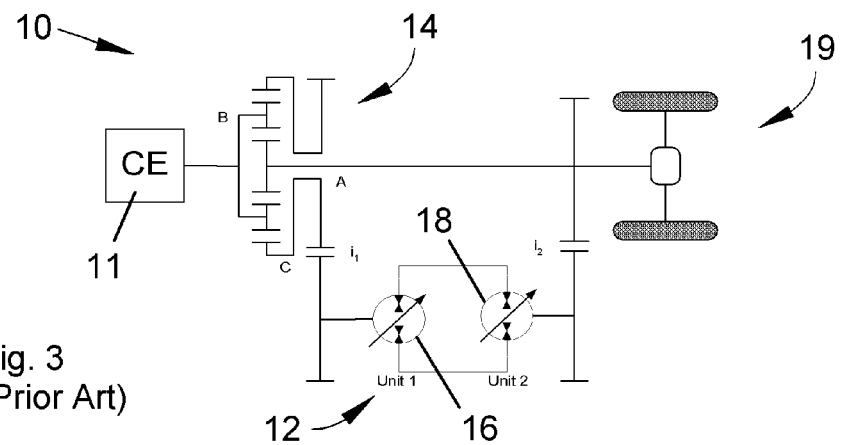
FIG. 3 schematically represents a basic output-coupled PSD transmission known in the prior art.

In view of the above, in contrast to the conventional output-coupled transmission 10 shown in FIG. 3, energy recovery with the PSD transmissions 110, 210, 310, and 410 of FIGS. 4 through 7 involves the use of different control of the displacement units 116 and 118. The displacement unit 116 is used to control the pressure in line A based on a lowest desired minimum pressure corresponding to the minimum fluid volume in the high pressure accumulator 120, and the displacement unit 118 is used to control the vehicle speed based on the desired vehicle speed. Therefore, as in the conventional output-coupled transmission of FIG. 3, a feedback signal from the vehicle speed is necessary for controlling the displacement unit 118. Additionally, a pressure signal from line A is employed to control the displacement unit 116.

As discussed above and represented in further detail in FIGS. 13A through 13D, the displacement unit 116 either operates as a pump or is freewheeling, while the displacement unit 118 either operates as a motor or pump. As such, the displacement unit 118 is an over-center unit that allows its operation as a motor or pump, while the displacement unit 116 may but does not require an over-center operation capability. The implementation of the described control concept, referred to as the secondary control principle, allows the implementation of the high and low pressure accumulators 120 and 122 for use in energy recovery without the need for switching valves in fluid lines A and B. However, the use of switching valves could be used and is therefore also within the scope of the invention.

The basic output-coupled PSD transmission 110 of FIG. 4 is designed in such a way that in forward speeds the transmission 110 runs solely in power additive mode, without ever entering full mechanical mode or power recirculation mode. As full mechanical mode is approached the speed of the displacement unit 116 decreases to zero. In the secondary controlled system of the output-coupled PSD transmission 110, this will result in the emptying of the accumulator 120 as flow exits to the displacement unit 118 but no flow is produced by the unit 116. In reverse the transmission 110 operates in power recirculation mode, with the unit 118 operating over center as a motor. Due to the direct coupling of the unit 118 to the shaft 138 and wheels 119, energy capture is possible in all speed ranges.

The operational modes are shown in more detail in FIGS. 13A through 13D and discussed below in particular reference to the basic output-coupled PSD transmission 110 of FIG. 4, though it should be understood that the operating principles also apply to the transmissions 210, 310, and 410 of FIGS. 5 through 7. During propulsion (Power Flow Modes 0, I, and II in FIGS. 13A, 13B and 13C, respectively) and braking (Power Flow Mode III in FIG. 13D), the fluid line A is always the high pressure line and fluid line B is always the low pressure line. At zero vehicle speed, $v_{veh}$, the displacement of the unit 118 is zero. As the desired vehicle speed ($v_{veh,des}$) is increased, the displacement of unit 118 increases, delivering a torque to the wheels 119. In propulsion, the vehicle may be powered by either the engine 111 or the high pressure accumulator 122.

Figure 13A:
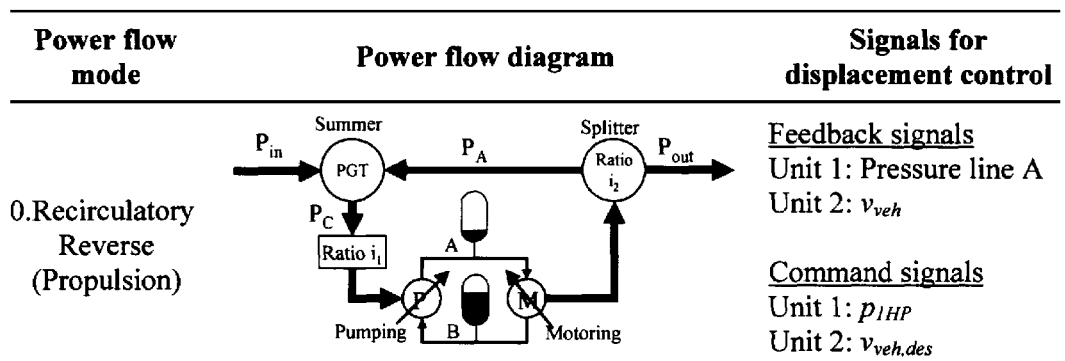
FIGS. 13A through 13D identify four power flow modes of output-coupled PSD transmissions of this invention.
Figure 13B:
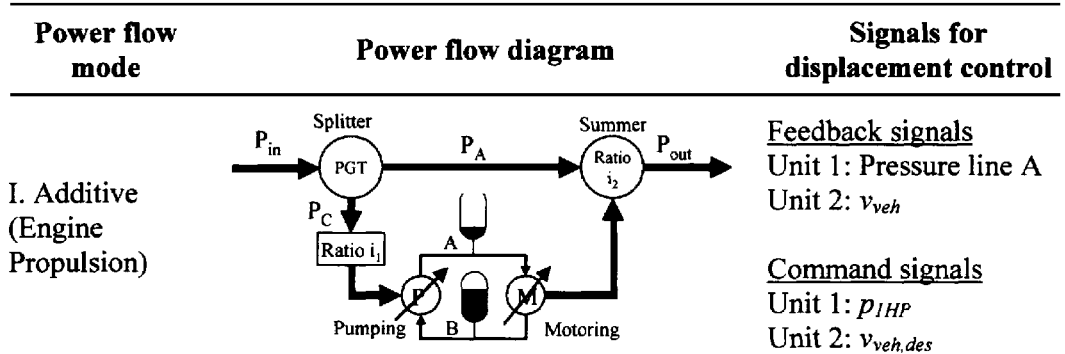

In propulsion, if the pressure in line A is at the minimum operating pressure ($p_{1HP}$), the transmission 110 will be running as a PSD transmission powered by the engine 111 (Power Flow Mode I in FIG. 13B). Unit 116 is in pumping mode and unit 118 is in motoring mode. Unit 116 holds the pressure in the fluid line A at the minimum operating pressure, $p_{1HP}$. As the pressure in line A drops below $p_{1HP}$, the displacement of unit 116 increases, filling the accumulator 120 and increasing the pressure in line A. As $v_{veh,des}$ increases, unit 118 increases in displacement, producing a torque on the wheels 119 of the vehicle. Power is transferred from the engine-driven shaft 128 both mechanically (PA) and hydraulically (PC). If, in propulsion, the pressure in line A is higher than $p_{1HP}$, the transmission 110 is powered solely by the high pressure accumulator 120 (Power Flow Mode II in FIG. 13C). The unit 116 is freewheeling and the unit 118 is in motoring mode. The unit 116 is controlled by the pressure in line A to zero displacement, and the unit 118 is controlled by $v_{veh,des}$. No power is transferred from the engine 111.

During braking (Power Flow Mode III in FIG. 13D), the unit 118 operates over center, producing a negative torque at the wheels 119 and acting in pumping mode. As the pressure in line A increases above $p_{1HP}$, unit 116 is controlled to zero displacement, and flow from unit 118 is used to charge the high pressure accumulator 120 to store brake energy. The displacement of unit 118, and therefore the amount of brake torque, is controlled by $v_{veh,des}$. If the high pressure accumulator 120 is filled, fluid flow from the unit 118 is directed to the low pressure accumulator 122 through a pressure relief valve. Therefore, the size of the accumulators 120 and 122 play an important role in brake energy recovery. No power is transferred back to unit 116 or the shaft 128. The use of additional braking may be necessary for both safety and high braking demands.

Figure 13C:
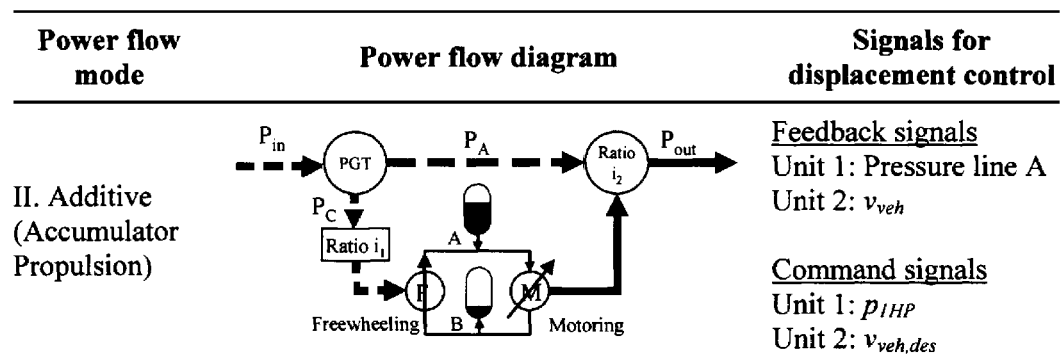
Figure 13D:
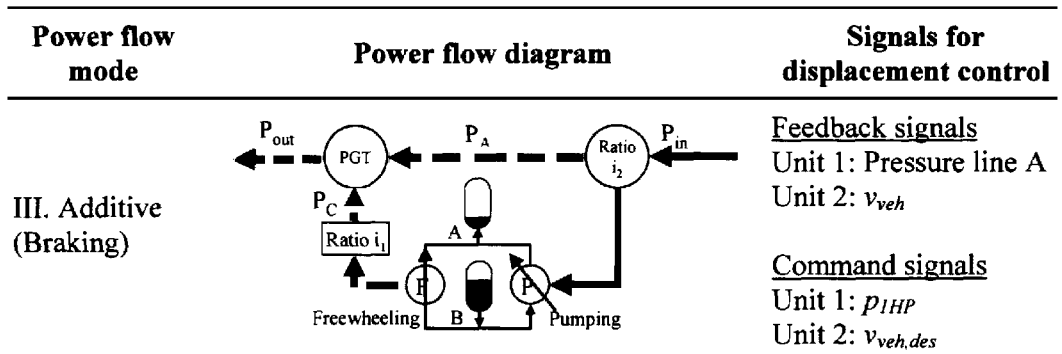

Reverse is accomplished by controlling the displacement unit 118 over center. If the pressure in fluid line A is at $p_{1HP}$, the transmission 110 runs in power recirculation mode (Power Flow Mode 0 in FIG. 13A). If the pressure in line A is above $p_{1HP}$, the vehicle will be powered by the high pressure accumulator 120, as in Power Flow Mode II (FIG. 13C).

Figure 9:
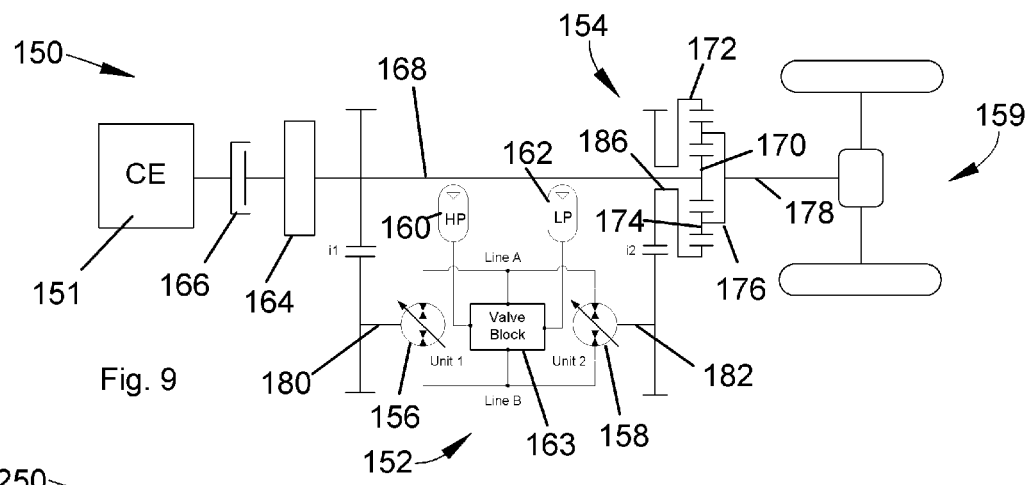
FIG. 9 schematically represents a basic input-coupled PSD transmission equipped with a flywheel and accumulator that provide an energy recovery capability in accordance with a fifth embodiment of this invention.

FIGS. 9 through 12 represent input-coupled PSD transmissions with energy recovery capabilities according to four additional embodiments of the invention. FIG. 9 represents a basic input-coupled PSD transmission 150 of this invention, with the energy storage capability provided in the form of two accumulators 160 and 162 and an optional flywheel 164. The flywheel 164 is mechanically coupled to a combustion engine 151 (or other suitable power source) through a freewheel clutch 166 that allows the engine 151 to drop to speeds lower than the rotational speed of the shaft 168 on which the flywheel 164 is mounted. The shaft 168 is coupled to a planetary (epicyclic) gear train 154 that forms part of the mechanical transmission system of the PSD transmission 150. As with conventional planetary gear trains, the planetary gear train 154 is represented as comprising a sun gear 170, a ring gear 172 circumscribing the sun gear 170, and planet gears 174 carried on a planet gear carrier 176 and simultaneously in mesh with the sun gear 170 and ring gear 172. In contrast to the output-coupled PSD transmissions 110, 210, 310, and 410 of FIGS. 4 through 7, the input-coupled PSD transmission 150 of FIG. 9 has its sun gear 170 coupled to the shaft 168 and its planet gear carrier 176 mounted on a shaft 178 coupled to the drive axle and wheels 159 of the vehicle.

The accumulators 160 and 162 are high pressure (HP) and low pressure (LP) accumulators, respectively, integrated into a hydrostatic transmission system 152 of the PSD transmission 150. The high pressure accumulator 160 is for energy storage and the low pressure accumulator 162 is for low pressure fluid storage. The hydrostatic transmission system 152 further includes first and second positive displacement units 156 and 158 (Units 1 and 2), respectively, each coupled to fluid lines A and B. The first and second units 156 and 158 are coupled to the ring gear 172 and shaft 168, respectively, with shafts 180 and 182 and suitable gearing. The high pressure and low pressure accumulators 162 and 164 are connected to the fluid lines A and line B through a valve block 163 whose components are schematically detailed in FIG. 15. Other than pressure relief valves (not shown), additional valves may be used but are not required for the embodiment of FIG. 9 as shown.

Figure 10:
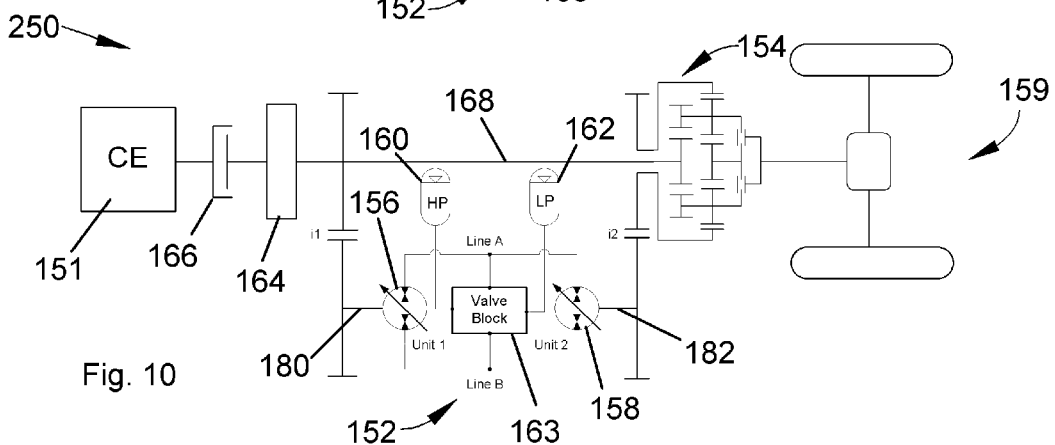
FIG. 10 schematically represents a multistage input-coupled PSD transmission equipped with a flywheel and accumulator that provide an energy recovery capability in accordance with a sixth embodiment of this invention.
Figure 11:
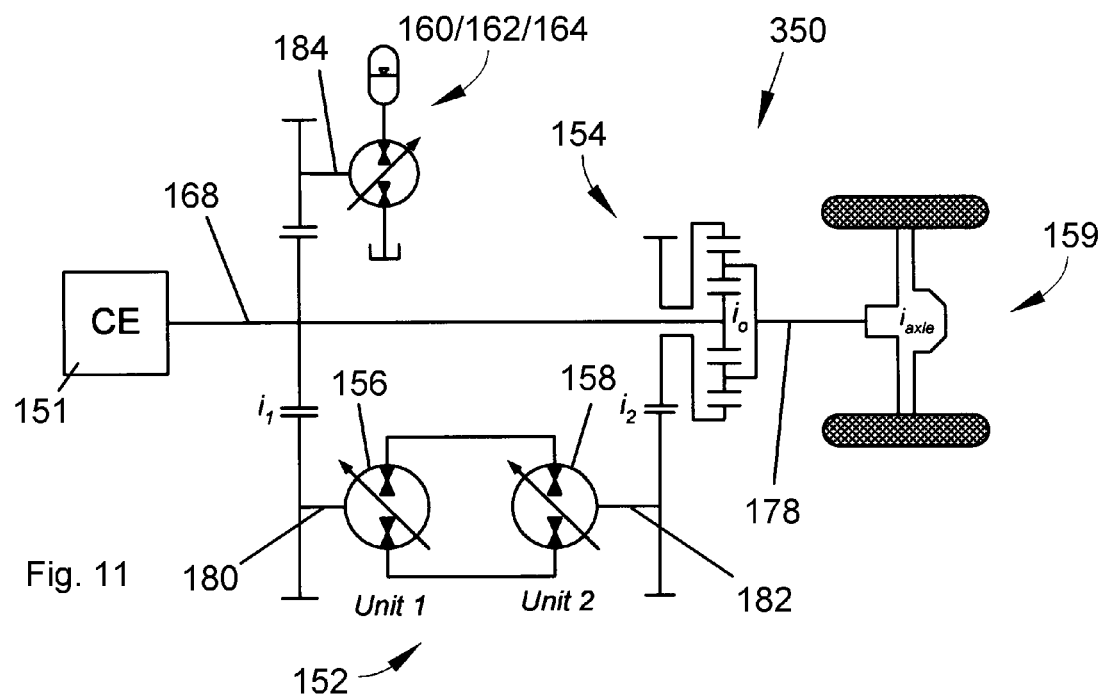
FIG. 11 schematically represents a basic input-coupled PSD transmission equipped with only an accumulator to provide an energy recovery capability in accordance with a seventh embodiment of this invention.
Figure 12:
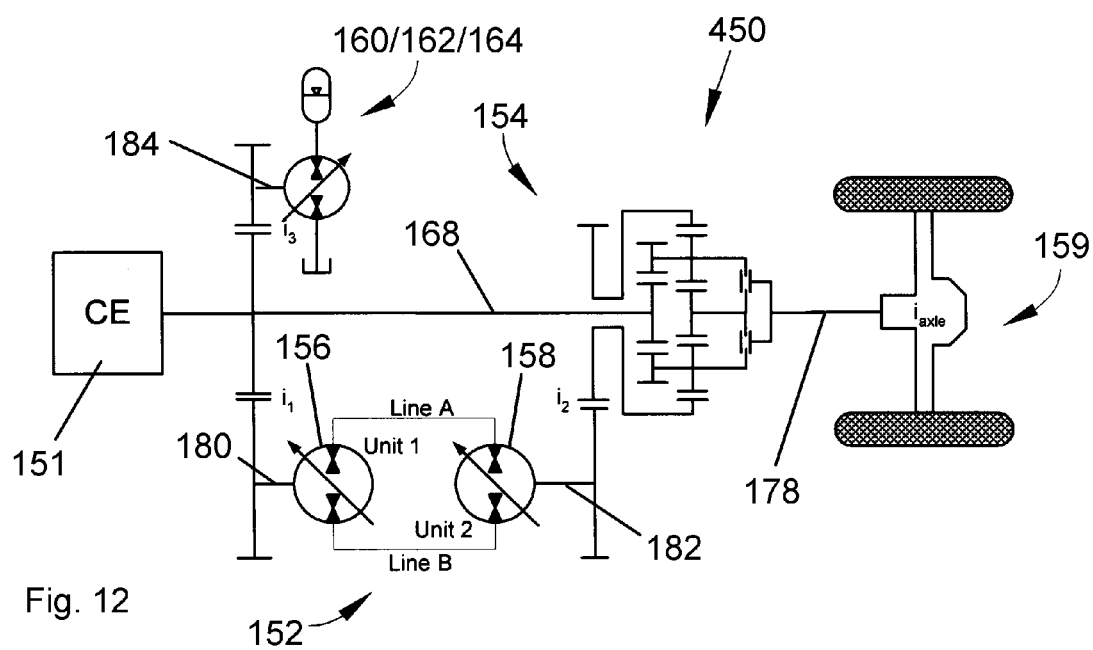
FIG. 12 schematically represents a multistage input-coupled PSD transmission equipped with only an accumulator to provide an energy recovery capability in accordance with an eighth embodiment of this invention.

FIG. 10 shows a multistage input-coupled PSD transmission 250 that is essentially the same as the basic input-coupled PSD transmission 150 of FIG. 9 (hence, the usage of the same reference numbers for its components), except that the planetary gear train 154 is a dual-stage planetary gear train capable of smaller or larger gear ratios, as known in the art. FIGS. 11 and 12 further show basic and multistage variations 350 and 450, respectively, of the PSD transmission 150 of FIG. 9 (hence, the usage of the same reference numbers for their components), but with energy storage means 160/162/164 coupled to the engine-driven shaft 168 by a shaft 184 and suitable gearing. While the energy storage means 160/162/164 is represented in FIGS. 11 and 12 as a single accumulator, one or more flywheels (with clutches) could be used, as could combinations of accumulator(s) and flywheel(s).

With the inclusion of the flywheel 164 coupled to the engine-driven shaft 168 and/or the accumulators 160 and 162 within the hydrostatic transmission system 152, brake energy can be stored and used for vehicle propulsion. Three main types of power flow modes are associated with the input-coupled PSD transmissions of FIGS. 9 through 12: propulsion via the engine 151 or flywheel 164; propulsion via the accumulator(s) 160/162; and braking using the flywheel 164 and/or the accumulator(s) 160/162. It is also possible to combine some forms of propulsion, for example, propulsion can also occur via a combination of the engine 151 and accumulator(s) 160/162, or a combination of the flywheel 164 and accumulators 160/162. Energy recovery can occur in both the additive and recirculation operating modes of the PSD transmissions 150, 250, 350, and 450.

In the power recirculation mode, propulsion of the vehicle can be accomplished through the use of power from the engine 151 or the flywheel 164. The power from the engine/flywheel 151/164 is carried through the shaft 168 and split in the planetary gear train 154 to the shaft 178 (coupled to the planet gear carrier 176) and a shaft 186 coupled to the hydrostatic transmission system 152 through the ring gear 172. The power at the shaft 178 is transferred to the wheels 159 to propel the vehicle, while the remainder is recirculated through the hydrostatic transmission system 152. Within the hydrostatic transmission system 152, the displacement unit 158 operates as a pump and the displacement unit 156 operates as a motor.

The power recirculation mode also allows for energy storage using the flywheel 164. When braking is desired, power is transferred from the shaft 178 to the engine shaft 168, which drives both the flywheel 164 and the displacement unit 156. The unit 156 operates as a pump while the unit 158 operates as a motor, transferring power to the shaft 186. Power from the shafts 178 and 186 is summed in the planetary gear train 154 and recirculated to the shaft 168. The freewheel clutch 166 allows the flywheel 164 to accelerate and rotate at speeds faster than the engine 151.

In the power additive mode, propulsion of the vehicle can be accomplished through the use of power from the engine 151 or the flywheel 164. Power from the engine/flywheel 151/164 is summed with the power of the hydrostatic transmission system 152 in the planetary gear train 154 through the shaft 168 (coupled to the sun gear 130) and shaft 186 (coupled to the ring gear 132). Within the hydrostatic transmission system 152, the displacement unit 156 operates as a pump and the displacement unit 158 operates as a motor.

Figure 8:
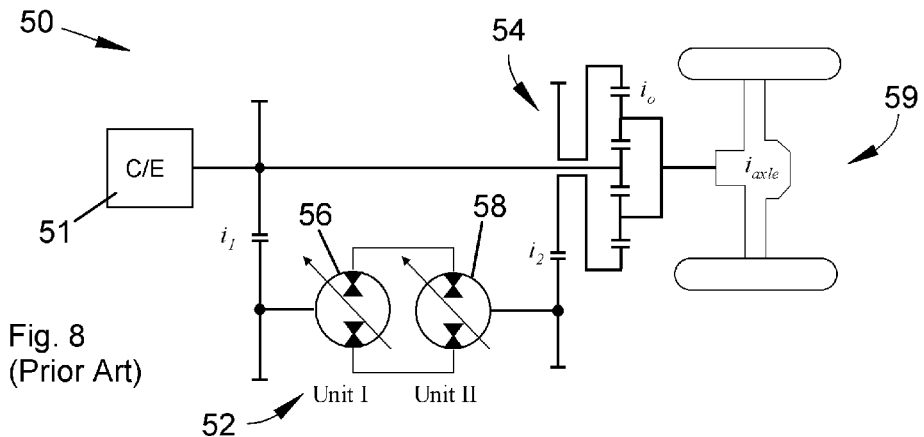
FIG. 8 schematically represents a basic input-coupled PSD transmission known in the prior art.

Propulsion of the vehicle can also be accomplished in the power additive mode through the use of stored energy from the HP accumulator 160. The stored energy is transferred to the units 156 and 158, both of which operate as motors to drive, respectively, the shaft 180 coupled to the shaft 168 and the shaft 182 coupled to the ring gear 172. If the flywheel 164 also has stored energy, power from the flywheel 164 and HP accumulator 160 can be used to propel the vehicle. Such a capability entails a change to the control of the displacements of the units 156 and 158 compared to FIG. 8.

Finally, energy storage can also occur in the power additive mode using the flywheel 164 and/or accumulator(s) 160/162. When braking is desired, power from the wheels 159 is transferred to the displacement unit 158 through the shaft 186 and to the flywheel 164 and displacement unit 156 through the shaft 168. When storing energy with the HP accumulator 160, both displacement units 156 and 158 operate as pumps to deliver fluid to the accumulator 160. The freewheel clutch 166 allows the flywheel 164 to accelerate and rotate at speeds faster than the engine 151.

Figure 15:
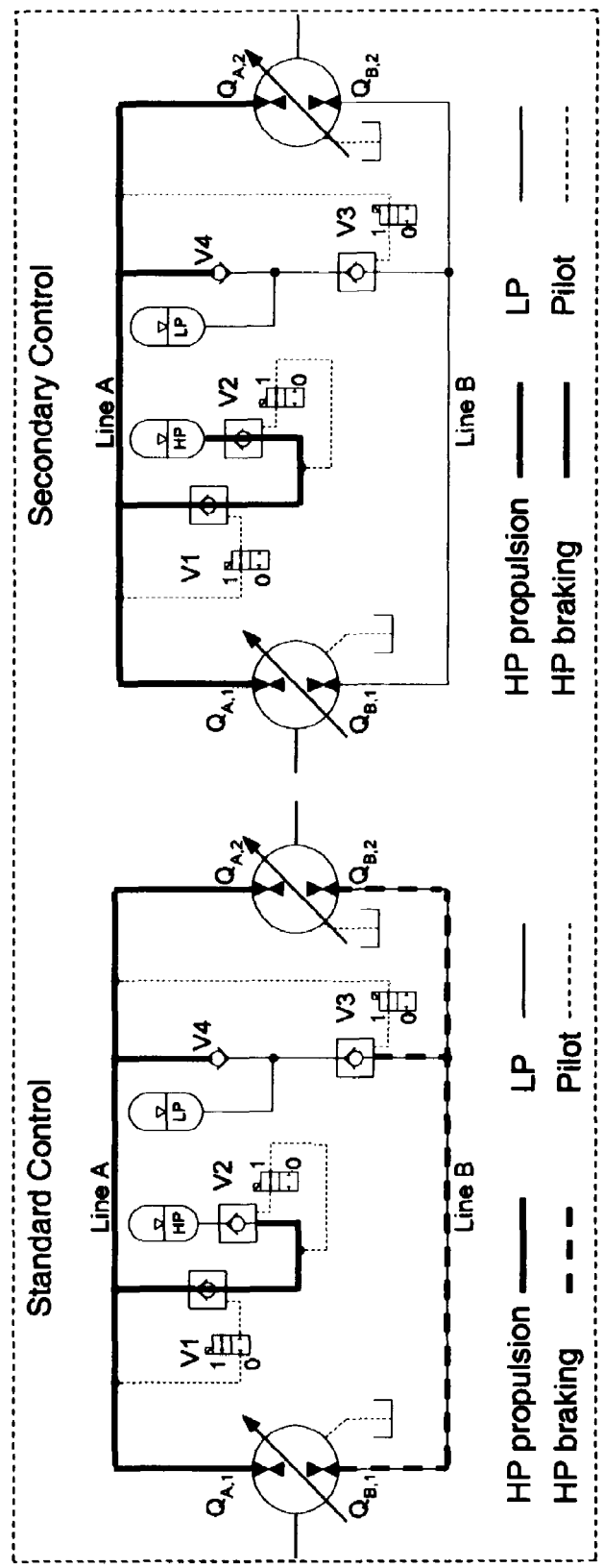
FIG. 15 schematically represents Standard Control and Secondary Control schemes for use with the input-coupled PSD transmissions of this invention.

A "Standard Control" scheme of the valve block 163 is represented on the lefthand side of FIG. 15. The valve block 163 includes a check valve V1 that prevents the HP accumulator 160 from discharging when in position 0, and a second valve V2 that prevents the HP accumulator 160 from being charged when in position 0. A third valve V3 prevents high pressure flow from entering the LP accumulator 162 when in position 0, and a check valve V4 prevents high pressure flow from entering the LP accumulator 162. FIG. 15 does not show the low pressure system of the hydrostatic transmission system 152 or high pressure relief valves that are preferably employed to direct flow to the LP accumulator 162 if the HP accumulator 160 is filled. Various options could be considered for handling the low pressure fluid of the hydrostatic transmission system 152.

A "Secondary Control" scheme is also represented in FIG. 15. With this scheme, the displacements of both displacement units 156 and 158 are controlled simultaneously by separate control signals. With the Secondary Control scheme, the differential system pressure is not simply a reactionary function of the load torque on the wheels 159, but is regulated to always operate at or above an allowable minimum pressure level, $p_{1HP}$, chosen so that the displacement unit 158 can produce a minimum allowable amount of torque at the wheel axle. The high pressure line is always fluid line A during Secondary Control. Measurement of vehicle speed and pressure in line A are used as feedback signals.

The full mechanical point, $v_{mech}$, marks the transition from Standard Control to Secondary Control. At vehicle speeds ($v_{veh}$) below $v_{mech}$, the input-coupled PSD transmissions 150, 250, 350, and 450 are controlled with the Standard Control scheme. $v_{mech}$ occurs at approximately 33% of the maximum vehicle velocity, and is described in Carl et al. (noted previously, and whose contents are incorporated herein by reference) as the vehicle speed at which the displacement unit 158 experiences zero rotational velocity:

$$v_{mech} \equiv (n_A/(1-i_o) \cdot i_{axle}) \cdot r_{tire}$$

where $n_A$ is the rotational speed of the shaft 168, $i_o$ is the standing gear ratio of the planetary gear train 154, $i_{axle}$ is the gear ratio of the wheel axle, and $r_{tire}$ is the dynamic rolling radius of the wheels 159. The vehicle velocity feedback signal, $v_{veh}$, and shaft speed, $n_A$, are all that is required to indicate that $v_{mech}$ has been reached and the transition from Standard Control to Secondary Control can occur. For any speed above $v_{mech}$, the transmissions 150, 250, 350, and 450 can be controlled with either Standard Control or Secondary Control, though energy recovery occurs only when the Secondary Control scheme is active. When the feedback signal $v_{veh}$ is greater than or equal to the calculated value $v_{mech}$ as defined in the equation above, the control scheme can be switched from Standard to Secondary Control. If the control scheme switch occurs, valves V1 through V3 are all energized.

The Power Flow Modes of the input-coupled PSD transmissions 150, 250, 350, and 450 are summarized in FIGS. 14A through 14G. It should be noted that the HP and LP accumulators 160 and 162 are coupled to the fluid lines A and B through the valve block 163, and not directly to the fluid lines A and B as shown in the simplified schematics used in FIGS. 14A through 14G. Each Power Flow Mode has a unique set of control signals, one signal for each unit.

During Modes 0 through III, under Standard Control the displacements of the displacement units 156 and 158 are controlled sequentially to achieve a desired vehicle speed, $v_{veh,des}$. During Mode IV under Secondary Control, the vehicle is propelled with engine power, the displacement of the unit 156 is controlled to maintain $p_{1HP}$ in the HP accumulator 160, and the displacement of the unit 158 is simultaneously controlled to achieve the desired vehicle speed, $v_{veh,des}$. The torque output of the unit 158 can be adjusted by changing the displacement of the unit 158, such that the resulting aiding torque on the wheel axle can be increased as necessary to attain the desired vehicle speed. During Mode V of the Secondary Control, the vehicle decelerates, the displacement of the unit 156 is controlled to regulate the speed of the shaft 168 to some desired speed, $n_{A,des}$, by exerting an appropriate amount of resistive torque on the shaft 168, and the displacement of the unit 158 is simultaneously controlled to achieve a desired vehicle speed, $v_{veh,des}$, by exerting an appropriate amount of resistive torque on the axle shaft through the shaft 186. As a result, the pressure level of the HP accumulator 160 increases as the vehicle's kinetic energy is stored in the form of pressurized fluid within the accumulator 160.

During Mode VI of Secondary Control, the vehicle is propelled with hydraulic power. The displacement of the unit 156 is again controlled to regulate the speed of the shaft 168 to some desired speed, $n_{A,des}$, by exerting an appropriate amount of aiding torque on the shaft 168. The engine speed is allowed to drop below $n_{A,des}$, while simultaneously the displacement of the unit 158 is again controlled to achieve a desired vehicle speed, $v_{veh,des}$, by exerting an appropriate amount of aiding torque on the axle shaft through the shaft 186. As a result, the pressure level within the HP accumulator 160 decreases as the accumulator's potential energy is transferred to vehicle kinetic energy.

At the full mechanical point, $v_{mech}$, the input-coupled PSD transmissions 150, 250, 350, and 450 switch naturally from power recirculation mode to power additive mode. Power from the wheels 159 travels through the planetary gear train 154 during braking maneuvers. During braking in power recirculation mode, the unit 158 operates as a motor and does not transfer energy to the HP accumulator 160. Similarly, although the unit 156 is operating as a pump during this time, it does not transfer energy to the HP accumulator 156. Consider that power enters the planetary gear train 154 through the shaft 178 during recirculation mode braking. If the engine 151 is incapable of storing energy due to the freewheel clutch 166, all power transferred to the unit 156 from the shaft 168 must be transferred to the shaft 186 through the unit 158 in order to balance the power flow within the planetary gear train 154, that is, power into the planetary gear train 154 must be equal to the power out of the planetary gear train 154. Storing energy in the HP accumulator 160 requires that not all power from the shaft 168 is transferred back into the shaft 186, creating a power unbalance within the planetary gear train 154. Therefore energy storage during power recirculation mode braking is not possible. During power additive mode, the units 156 and 158 operate as pumps during braking maneuvers and are capable of transferring energy to the HP accumulator 160. Power and therefore energy transferred into the planetary gear train 154 through shaft 178 is transferred to the HP accumulator 160 through the units 156 and 158 via the shafts 168 and 186, respectively, such that the power balance within the planetary gear train 154 is satisfied. Since energy capture is only possible during power additive mode, it is advantageous to decrease the engine speed allowing for a lower value of $n_{A,des}$ during braking maneuvers to extend the energy capture region as much as possible, since lowering $n_A$ lowers $v_{mech}$.

The potential for fuel savings through the use of the output-coupled and input-coupled PSD transmissions of FIGS. 4 and 9 were modeled using a software library entitled Power Split Drive Design (PSDD), built in a Matlab/Simulink environment and reported in Mikeska et al., "Virtual Prototyping of Power Split Drives," Proc. Bath Workshop on Power Transmission and Motion Control PTMC (2002), Bath, UK, p. 95-111, whose contents are incorporated herein by reference. The model simulated the use of a reference vehicle with a 225 kW engine and a maximum driving speed of 160 km/h under an urban dynamometer driving cycle. At the conclusion of the simulation, the output-coupled PSD transmission 110 of FIG. 4 was indicated as being the most advantageous solution in terms of energy savings for the reference vehicle and the studied drive cycle. As compared to a conventional input-coupled PSD transmission (FIG. 8), the output-coupled and input-coupled PSD transmissions 110 and 150 of this invention were predicted to have energy efficiency savings of about 35.27% and about 16.19%. The output-coupled PSD transmission 110 further showed a distinct advantage over the input-coupled PSD transmission 150 in its ability to capture energy at all speed ranges during the simulated drive cycle. This result may be attributable to the direct connection between the displacement unit 118 and the wheel axle that exists in the output-coupled system, eliminating the need for power flow to exist in the planetary gear train 114 during energy capture maneuvers. The input-coupled system was limited to energy capture only at vehicle speeds greater than $v_{mech}$, roughly 33% of the maximum velocity.

While the invention has been described in terms of specific embodiments, it is apparent that other forms could be adopted by one skilled in the art. For example, the physical configuration of the PSD transmissions could differ from those shown, and components capable of function similar to the components described could be use. Therefore, the scope of the invention is to be limited only by the following claims.

The invention claimed is:

1. A power split transmission capable of energy recovery, the power split transmission comprising:
    a mechanical transmission system comprising a rotatable input shaft and at least a first planetary gear train;
    the first planetary gear train comprising a sun gear coupled to the input shaft, a carrier directly coupled to a rotatable output shaft [178], and a ring gear directly coupled to a rotatable third shaft[186], the first planetary gear train being adapted for mechanically transmitting mechanical power between the third shaft, the input shaft and the output shaft [178];
    a hydraulic transmission system [152] containing a fluid adapted for hydraulically transmitting hydraulic power to and from the input shaft and the third shaft [186], the hydraulic transmission system [152] being continuously operatively coupled by the third shaft to the first planetary gear train; and
    at least one of the mechanical and hydraulic transmission systems [154, 152]; [154, 152] comprising means for storing and releasing energy within the power split transmission, the energy storing and releasing means comprising a flywheel or an accumulator or a combination thereof;
    wherein the mechanical transmission system [154,158] and the hydraulic transmission system [152] are coupled to the input and output shafts [168, 178] so that the power split transmission is operable to recirculate power that is selectively received by the hydraulic transmission system [152] from the output shaft [178] through the first planetary gear train and the third shaft [186], and then delivered by the hydraulic transmission system [152] through the input shaft to the first planetary gear train.

2. The power split transmission according to claim 1, further comprising means for operating the mechanical and hydraulic transmission systems so that the power split transmission has multiple operating modes,
    a first operating mode characterized by the output shaft receiving power from the input shaft through at least one of the mechanical and hydraulic transmission systems,
    a second operating mode characterized by the output shaft receiving power from the energy storing and releasing means,
    a third operating mode characterized by the output shaft receiving power from the input shaft through at least one of the mechanical and hydraulic transmission systems and from the energy storing and releasing means thereof, and
    a fourth operating mode characterized by the output shaft delivering power to the energy storing and releasing means.

3. The power split transmission according to claim 1, further comprising means for operating the mechanical and hydraulic transmission systems so that the power split transmission has multiple operating modes,
    a first operating mode characterized by the output shaft receiving mechanical power through the mechanical transmission system and hydraulic power through the hydraulic transmission system,
    a second operating mode characterized by the output shaft receiving only mechanical power through the mechanical transmission system, and
    a third operating mode characterized by the mechanical transmission system receiving hydraulic power through the hydraulic transmission system, the hydraulic transmission system receiving mechanical power through the mechanical transmission system, and the output shaft receiving less than all of the mechanical power of the mechanical transmission system and less than all of the hydraulic power from the hydraulic transmission system.

4. The power split transmission according to claim 3, wherein the energy storing and releasing means uses a portion of the mechanical power to generate stored energy when the power split transmission is operating in the third operating mode.

5. The power split transmission according to claim 1, wherein the energy storing means comprises a flywheel coupled to at least one of the input and third shafts.

6. The power split transmission according to claim 1, wherein the energy storing means consists of a flywheel coupled to the input shaft.

7. The power split transmission according to claim 1, wherein the energy storing means consists of a flywheel coupled to the third shaft.

8. The power split transmission according to claim 1, wherein the energy storing means comprises at least one accumulator.

9. The power split transmission according to claim 8, the hydraulic transmission system further comprising a positive displacement device fluidically coupled to the accumulator, the positive displacement device being operable to store energy from the power split transmission by operating as a pump to store a portion of the fluid at an elevated pressure in the accumulator and operable to release energy to the power split transmission by operating as a motor driven by the fluid released from the accumulator.

10. The power split transmission according to claim 9, wherein the hydraulic transmission system is mechanically coupled through the first planetary gear train to the input shaft and mechanically coupled to the output shaft.

11. The power split transmission according to claim 9, wherein the hydraulic transmission system is mechanically coupled to the input shaft and mechanically coupled through the first planetary gear train to the output shaft.

12. The power split transmission according to claim 9, wherein the hydraulic transmission system is mechanically coupled to the input shaft and the first planetary gear train is a multi-stage planetary gear train that mechanically couples the hydraulic transmission system to the output shaft.

13. The power split transmission according to claim 8, the hydraulic transmission system further comprising a positive displacement device fluidically coupled to the accumulator and mechanically coupled to the mechanical transmission system.

14. The power split transmission according to claim 8, wherein the energy storing means does not comprise a flywheel.

15. The power split transmission according to claim 8, wherein the hydraulic transmission system is mechanically coupled through the first planetary gear train to the input shaft and mechanically coupled to the output shaft.

16. The power split transmission according to claim 8, wherein the hydraulic transmission system is mechanically coupled to the input shaft and mechanically coupled through the first planetary gear train to the output shaft.

17. The power split transmission according to claim 8, wherein the hydraulic transmission system is mechanically coupled to the input shaft and the first planetary gear train is a multi-stage planetary gear train that mechanically couples the hydraulic transmission system to the output shaft.

18. The power split transmission according to claim 1, wherein the power split transmission does not comprise a clutch adapted to decouple the hydraulic transmission system and the mechanical transmission system from each other.

* * * * *